United States Patent
Chawla et al.

(10) Patent No.: US 7,320,122 B2
(45) Date of Patent: Jan. 15, 2008

(54) SPECIFICATION TO ABAP CODE CONVERTER

(75) Inventors: Sachinder S. Chawla, San Francisco, CA (US); Jason Chen, Fremont, CA (US); Alexander Gorelik, Fremont, CA (US); Hon C. Thio, Castro Valley, CA (US); Dave Wang, San Jose, CA (US)

(73) Assignee: Business Objects Data Integration, San Jose, CA (US)

( * ) Notice: Subject to any disclaimer, the term of this patent is extended or adjusted under 35 U.S.C. 154(b) by 576 days.

(21) Appl. No.: 10/854,287

(22) Filed: May 25, 2004

(65) Prior Publication Data

US 2005/0055669 A1    Mar. 10, 2005

Related U.S. Application Data

(63) Continuation of application No. 09/260,121, filed on Mar. 2, 1999, now Pat. No. 6,772,409.

(51) Int. Cl.
*G06F 9/44* (2006.01)

(52) U.S. Cl. ............... 717/109; 717/107; 717/108; 717/117

(58) Field of Classification Search ............... None
See application file for complete search history.

(56) References Cited

U.S. PATENT DOCUMENTS

| | | | |
|---|---|---|---|
| 4,506,326 A | 3/1985 | Shaw et al. | |
| 5,448,740 A | 9/1995 | Kiri et al. | |
| 5,530,848 A | 6/1996 | Gilbert et al. | |
| 5,758,032 A | 5/1998 | Sanders | |
| 5,815,713 A | 9/1998 | Sanders | |
| 5,842,212 A | 11/1998 | Ballurio et al. | |
| 6,148,335 A | 11/2000 | Haggard et al. | |
| 6,192,370 B1 | 2/2001 | Primsch | |

FOREIGN PATENT DOCUMENTS

| | | |
|---|---|---|
| EP | 0511437 A1 | 11/1992 |
| EP | 0602263 A1 | 6/1994 |
| EP | 0737918 A2 | 10/1996 |

OTHER PUBLICATIONS

SAP R/3 Data Warehouse and Application Integration, pp. 1-17.
Enterprise Data Warehousing for SAP R/3©, 1998, pp. 1-17.
Curran, "Technical Review: SAP's ABAP/4 Development Workbench," *Object Manager*, Dec. 1994, pp. 10-15.
Date, "An Introduction to Database Systems," vol. I, 5th Edition, *Addison-Wesley Publishing Company*, 1990, pp. 455-488.

*Primary Examiner*—Chuck Kendall
(74) *Attorney, Agent, or Firm*—Cooley Godward Kronish LLP

(57) ABSTRACT

A method of generating procedural language code for extracting data from a data warehouse comprising the steps of accepting a declarative specification and generating procedural language code to execute the declarative specification.

23 Claims, 6 Drawing Sheets

```
CREATE VIEW MyJoin (VBELN char(10)KEY, POSNR varchar(6)
KEY, AUART char(4), VKGRP char(3), VKBUR char(4), GUEBG
date, GUEEN date, BNAME char(35), MATNR char(18), MATWA
char(18), KMPMG decimal(13,3), WAVWR decimal(13,2), NETPR
decimal(11,2))

AS SELECT VBAK.VBELN, VBAP.POSNR, VBAK.AUART,
VBAK.VKGRP, VBAK.VKBUR, VBAK.GUEBG, VBAK.GUEEN,
VBAK.BNAME, VBAP.MATNR, VBAP.MATWA, VBAP.KMPMG,
VBAP.WAVWR, VBAP.NETPR
    FROM VBAK,VBAP
        WHERE VBAK.VBELN = VBAP.VBELN;
```

FIG. 5

```
CREATE VIEW MyJoin (VBELN char(10) KEY, POSNR varchar(6) KEY, AUART
char(4), VKGRP char(3), VKBUR char(4), GUEBG date, GUEEN date, BNAME
char(35), MATNR char(18), MATWA char(18), KMPMG decimal(13,3), WAVWR
decimal(13,2), NETPR decimal(11,2))

AS SELECT VBAK.VBELN, VBAP.POSNR, VBAK.AUART, VBAK.VKGRP,
VBAK.VKBUR, VBAK.GUEBG, VBAK.GUEEN, VBAK.BNAME, VBAP.MATNR,
VBAP.MATWA, VBAP.KMPMG, VBAP.WAVWR, VBAP.NETPR
    FROM VBAK,VBAP
        WHERE VBAK.VBELN = VBAP.VBELN AND VBAP.POSNR = 'XYZ123';
```

SPECIFICATION TO ABAP CODE CONVERTER

CROSS-REFERENCES TO RELATED APPLICATIONS

This application is a continuation of U.S. patent application Ser. No. 09/260,121, filed on Mar. 2, 1999 now U.S. Pat. No. 6,772,409 entitled, "SPECIFICATION TO ABAP CODE CONVERTER." This application is hereby incorporated by reference as if set forth in full in this document.

BACKGROUND OF THE INVENTION

The present invention relates to database processing in general and to generation of ABAP code in particular.

SAP R/3 system is an Enterprise Resource Management system used to manage various IT subsystems used to operate a company (e.g., manufacturing, sales and distribution, logistics) in an integrated fashion. A typical SAP R/3 installation requires extensive configuration to embed the specific business rules for the company using SAP R/3 into the system as well as produce the reports required by the company. Most of a generic SAP R/3 system as well as most of the configuration and reporting is written using the ABAP/4 language.

One approach to extracting data uses ETL ("Extraction, Transformation and Loading") tools to convert a procedural specification into a procedural language to execute that specification. However, since the specification is a procedural specification, the user has to manually specify the optimal (most efficient and fastest) way of executing the specification.

SUMMARY OF THE INVENTION

According to one embodiment of the present invention, procedural language code is generated for extracting data from an operational system such as an SAP R/3 system, for transforming it and for loading it into a target system, such as a data warehouse. This is done by accepting a declarative specification and generating procedural language code to execute the declarative specification.

The data extraction process for extracting data from an SAP R/3 system accepts a declarative specification, in visual form or otherwise, and uses an optimizer to optimize the specification and generate an execution plan to perform the extractions and transformations specified in the declarative specification. The process then generates a procedural program in the ABAP language to perform the operation. This approach allows the user to focus on what needs to be done, while the system takes care of the most efficient way for how to do it. Figuring out the most efficient way for executing the specification is a complicated process and will take much effort if done manually by the user. This approach is particularly beneficial when the specification is revised, because the system can easily reoptimize the entire specification and produce a new optimal plan.

A further understanding of the nature and advantages of the inventions herein may be realized by reference to the remaining portions of the specification and the attached drawings.

BRIEF DESCRIPTION OF THE DRAWINGS

FIG. 5 is an illustration of a set of declarative language statements.

FIG. 6 is a second illustration of a set of declarative language statements.

FIG. 7 is an illustration of metadata imported for a table from an SAP R/3 system.

This application includes two appendices listing ABAP program code.

DESCRIPTION OF THE SPECIFIC EMBODIMENTS

Figure 1:
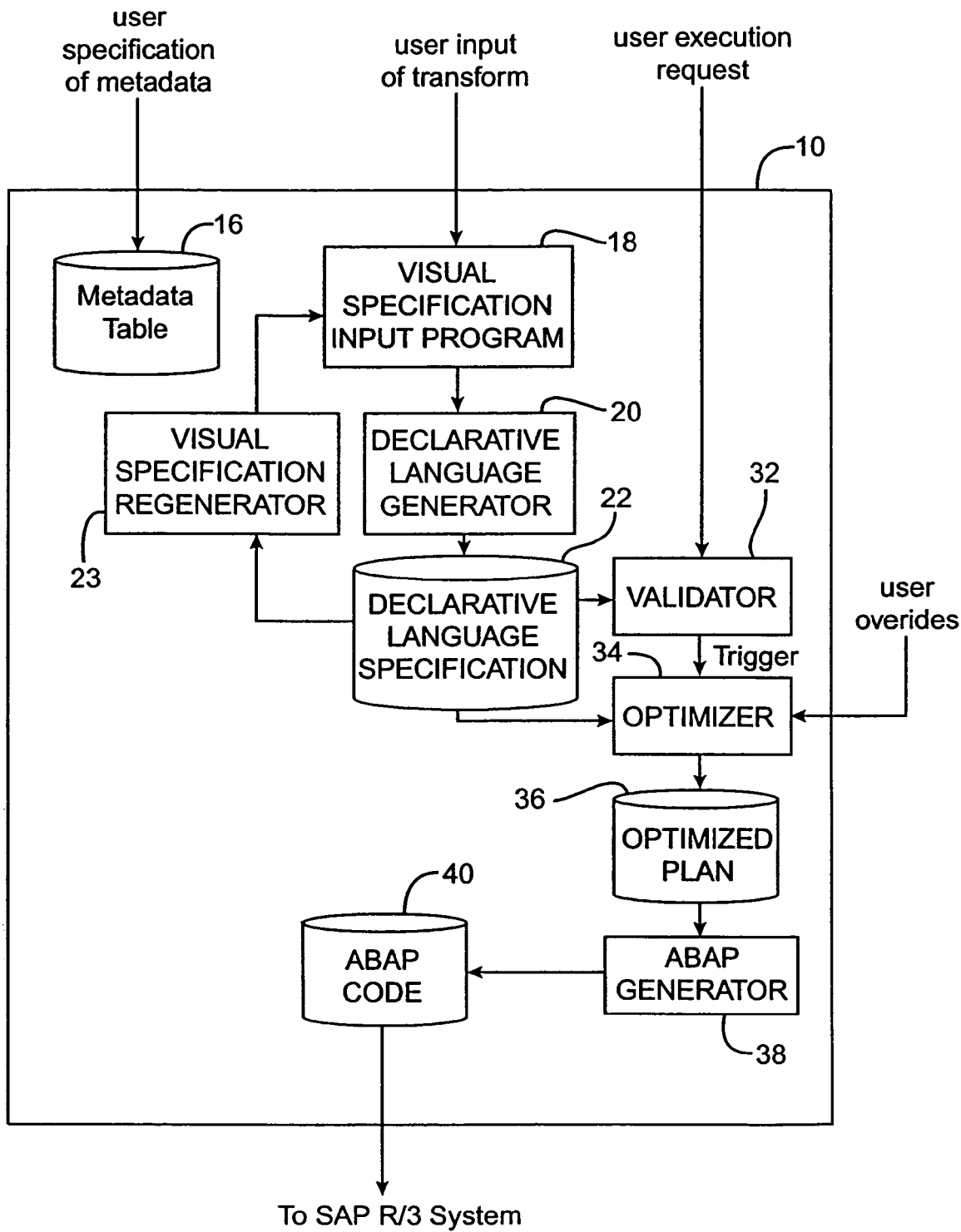
FIG. 1 is a block diagram of a converter according to one embodiment of the present invention for generating an ABAP program from a specification.
Figure 7:
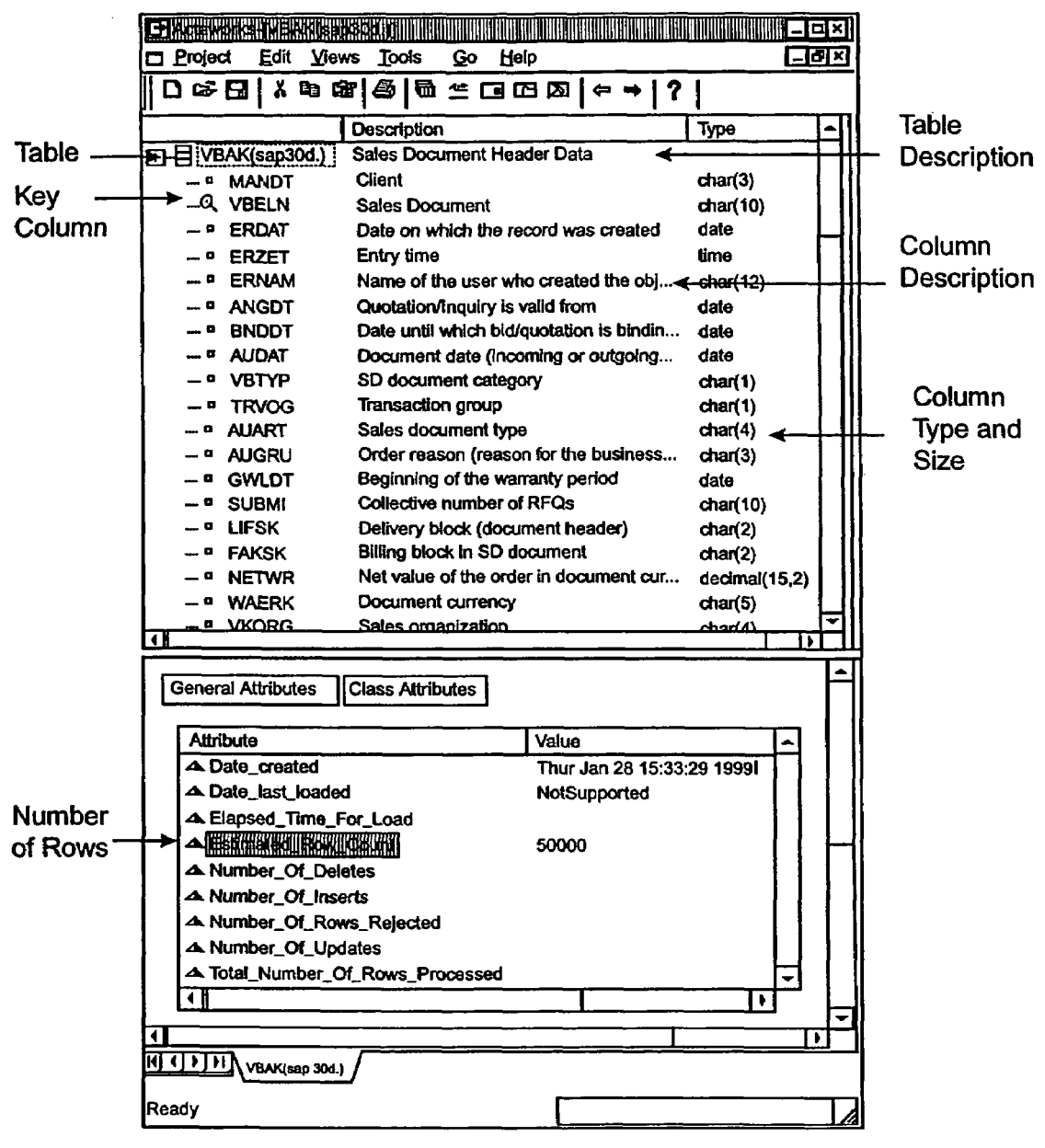

There are three steps to optimized ABAP generation as performed by a converter 10 of specifications to ABAP code used to extract data from a SAP R/3 system. Such a converter 10 is shown generally in FIG. 1. The first step is importing metadata about the SAP data that the ABAP code will access. This metadata includes an indication of what SAP tables are available for reading and the columns, keys, sizes and primary-foreign key relationships for those tables. A sample of such metadata is shown in FIG. 7. The metadata is extracted from the SAP data dictionary and stored in a metadata repository 16.

The second step is specifying the transformations to be made by the converter. In a preferred embodiment, a user visually specifies the transformations. For example, a user might use an input device to input the transformations, including the sources, targets for the transformations by way of a visual specification input program 18 (see FIG. 3). A declarative language generator 20 then generates a declarative language specification from the visual representation and stores the specification in a repository 22. If the user wants to change the specification, the declarative language specification is read from repository 22, converted to a visual representation by a regenerator 23, and displayed to the user using visual specification input program 18. Any changes made to the visual specification are converted back into the declarative language specification and stored back in the repository 22. Each declarative language specification stored in repository 22 is named by the user with a job name The third step is executing the transformation specification from repository 22 upon user request. This is done by various elements shown in FIG. 1. Once triggered by a user, a validator 32 reads a specification having the job name requested by the user from repository 22 and validator 32 validates the specification against the imported metadata stored in metadata 16. Validator 32 ensures that, for example, the tables and columns used in the specification exist, column types match the metadata or, if they do not match, can be converted automatically. For example, an integer can be converted to a string, but a date might not be convertible to a floating-point number automatically. Other validations include ensuring that all columns and tables exist and that the correct number and type of parameters are passed to functions.

Figure 4:
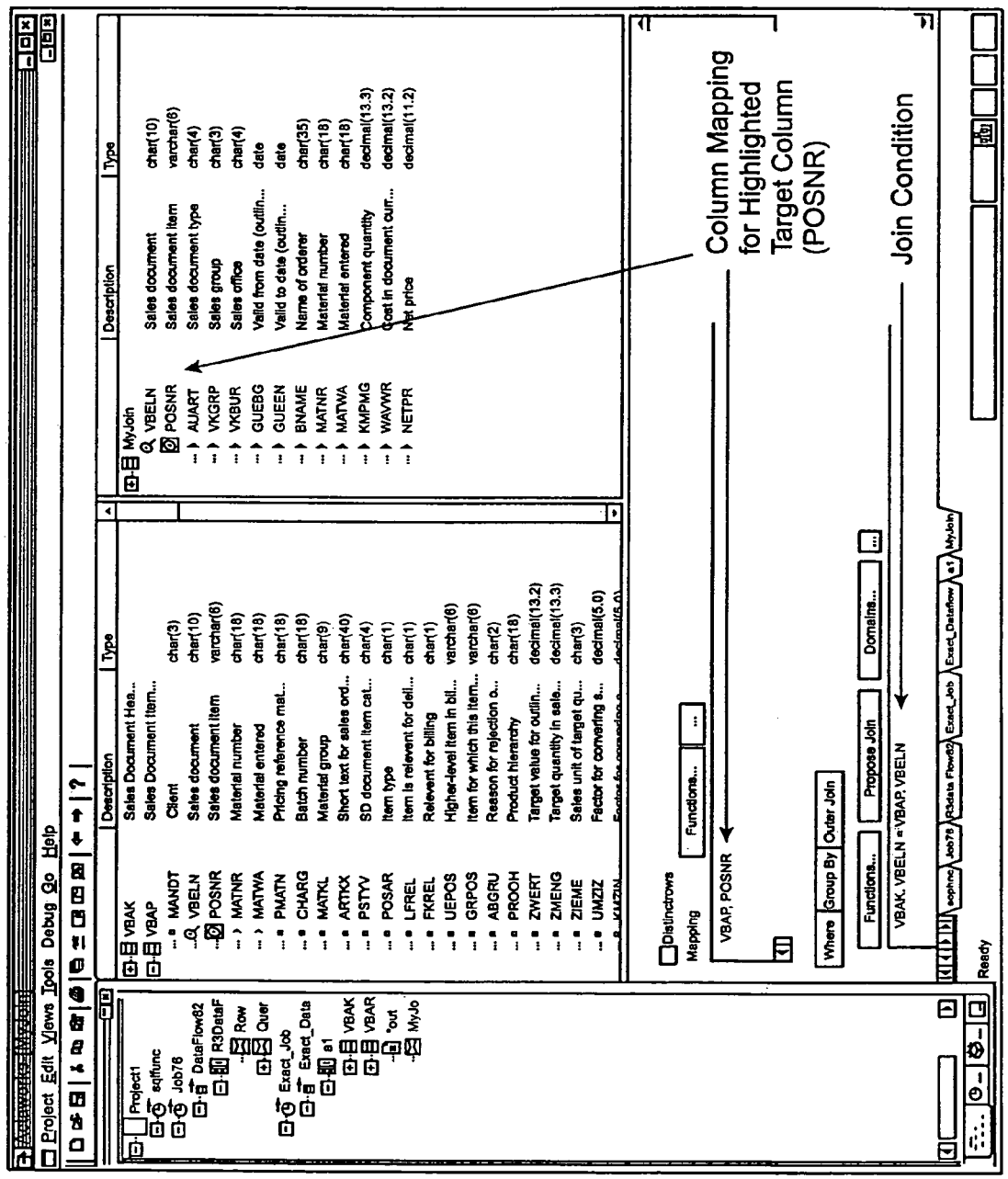
FIG. 4 is a screen shot of a display of a computer system used to graphically input specifications.

Once validator 32 validates the specification, validator 32 passes the specification, or a reference thereto, to an optimizer 34. If validator 32 does not validate the specification, it does not pass the specification on and issues an error message. Optimizer 34 determines the optimum way to perform the tasks specified in the specification. An example of this is shown in FIGS. 4-5. The output of optimizer 34 is an optimized "plan" 36. The optimizer uses all available information such as sizes of tables, key information, index information and primary-foreign key relationships to determine the best way to perform the tasks. The best way is generally the least computationally intensive (i.e., using the least amount of computer resources), but may also be defined as the fastest regardless of how many resources it uses. In some cases, the users may choose to override the optimizer by specifying the plan themselves.

Optimizer 34 provides the optimized plan 36 to an ABAP code generator 38, which generates the ABAP language code 40 usable to execute the plan. The specification tells the converter 10 what to extract, transform and load while the plan is an optimized execution plan generated by the optimizer that tells converter 10 how to extract, transform and load the data. Samples of such code can be found in the appendices to this application.

Figure 2:
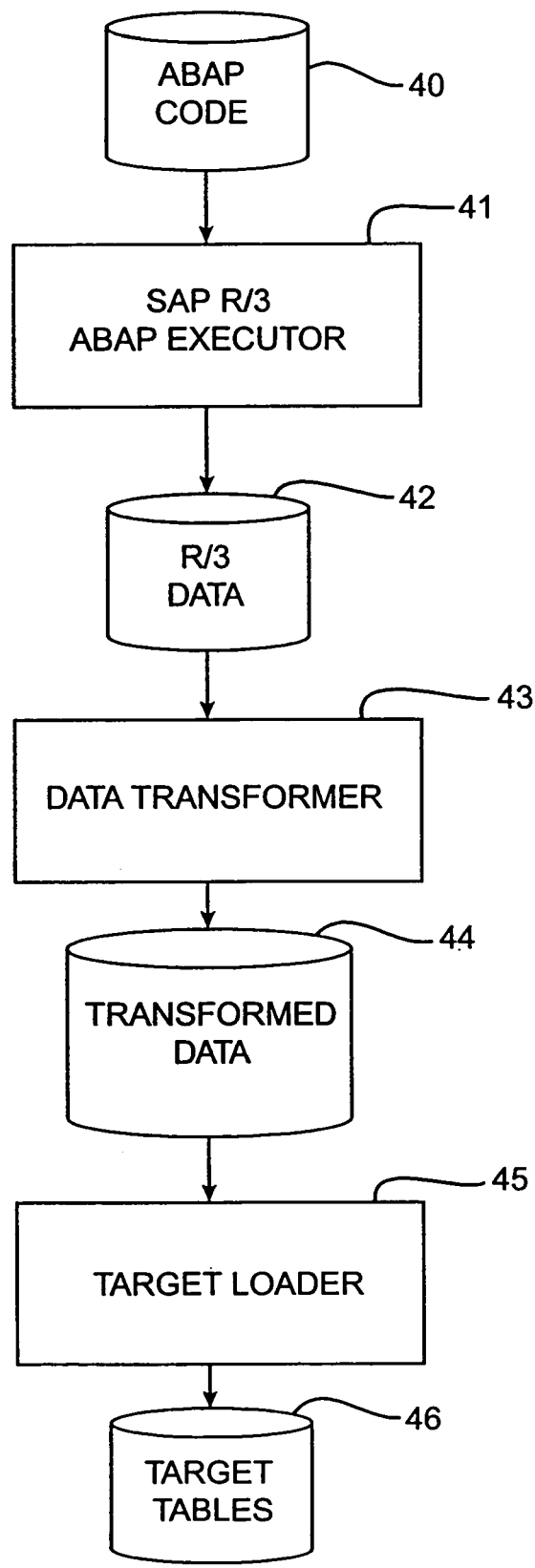
FIG. 2 is a block diagram of a process for executing an ABAP program according to one embodiment of the present invention.

ABAP code 40 is then executed by the SAP R/3 system and the data retrieved from SAP, as illustrated in FIG. 2. As shown there, a SAP R/3 ABAP executor 41 executes ABAP code 40, resulting in R/3 data 42 and a data transformer 43 transforms R/3 data 42 into transformed data 44 according to the user specification. For example, if the SAP-specific part extracts a list of employees from SAP, additional transformations performed outside of the SAP R/3 system may look up salary paid to date from a payroll system in an Oracle™ database as well as a 401K balance stored in a PeopleSoft™ employee tracking system.] A target loader 45 then uses this transformed data 44 to populate target tables 46. A target table 46 is typically (but not necessarily) in a data warehouse. It is populated with the data extracted from the operational systems and transformed according to the user specifications as described above.

Figure 3:
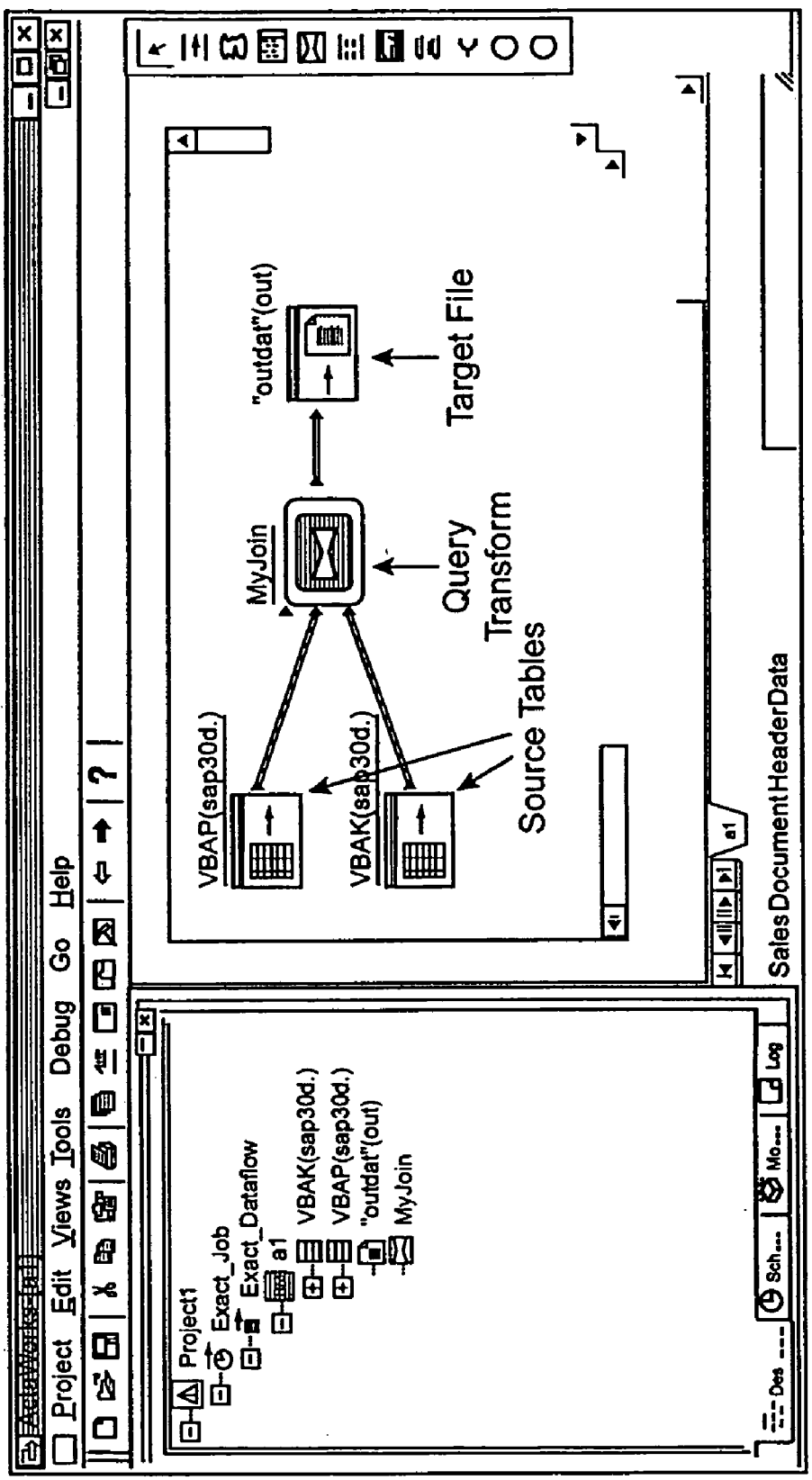
FIG. 3 is a screen shot of a display of a computer system used to generate a visual representation of a specification.

FIG. 3 illustrates the table inputs and outputs as well as the query transform. The Source tables are inputs into the Query Transform called MyJoin. The results of the query are loaded into the target file.

FIG. 4 is a screen shot of a display of the specification of the join in MyJoin Query Transform shown in FIG. 3. As shown therein, the join condition is specified in the Where tab, while the mappings for the columns are displayed in the Mapping window. The diagram shows the mapping for the highlighted column (POSNR) —which is set to the value of the POSNR column of the input table VBAP.

An example of the declarative language resulting from the visual specification shown in FIG. 4 is shown in FIG. 5. The declarative language statements are a dialect of SQL called ATL, which is short for "Acta Transformation Language", a language developed by the assignee of the present application. Although the statements are shown in ATL, they could be represented in any declarative language.

In the example described above, optimizer 34 would determine that VBAK (the order header) is much smaller than VBAP (the line item), as each order typically has multiple line items. Therefore, optimizer 34 would set up a loop join with VBAK as the outer table and VBAP as the inner table. A query server executing a loop join selects a row from VBAK (an order header), then gets all rows from VBAP that match the Sales Document number (VBELN) for that order (all the line items).

Appendix A is a listing of the generated ABAP program, with the code corresponding to the join shown in bold.

Another example of generated ABAP code is shown in FIG. 6. There, an additional condition exists on the line item.

Optimizer 34 would notice that since it has a predicate on the primary key for the VBAP table, it would only get a single row from that table. Therefore, it would be a less work computationally to select a single order line item from VBAP (the one with POSNR='XYZ123') and then look up the order header record for it from VBAK, then to go through ALL the order headers (VBAK) and for each to go through all the line items (VBAP) until we find the one with POSNR= 'XYZ123'. Therefore, the optimizer would then make VBAP the outer table and generate the ABAP code shown in Appendix B.

In a specific example, converter 10 processes a declarative specification to generate a procedural language program and executes the procedural language program. The declarative specification specifies what to do, but not necessarily how to do it. For example, a specification might specify joining an employee table with address tables based on employee ID. In SQL, a statement to this effect might be:

SELECT EMPLOYEE.NAME, ADDRESS.STREET_ADDRESS
FROM EMPLOYEE, ADDRESS WHERE
EMPLOYEE.EMPLOYEE_ID=ADDRESS. MPLOYEE_ID

It is up to converter 10 to figure out the best way to execute that specification and join the two tables. One way to join the tables is to take a row from the employee table, extract the employee ID, read the address table and, for every row, check for a match of the row's employee ID and the employee ID extracted from the employee table and return the two rows in the case of a match.

One way to execute the specification is to generate ABAP code and execute that ABAP code. ABAP is a procedural language used by the SAP R/3 system. Converter 10, in addition to generating ABAP code, applies query optimization techniques to the specification in generating the ABAP code optimally.

Converter 10 can generate ABAP code for both scalar functions and vector functions. ABAP programmers can create functions in the ABAP language, but such functions do not return any value and have input and output parameters. Using the code generating capabilities of converter 10, however, a declarative specification could include calls to scalar functions. An example of a scalar function usage is:

SELECT FOO(T.A)::Y FROM T WHERE FOO(T.B)::Z>10 where the function FOO has one input parameter (X) and two output parameters (Y and Z). The above function comprises two calls. In the first call, column A is passed as input parameter X and the value of output parameter Y is returned by the function. In the second call, column B is passed as the input parameter X and the value of output parameter Z is returned by the function and compared to 10. In addition, functions can be used to return multiple values. For example, the select statement SELECT FOO(T.A) FROM T would return the values of the two output parameters (Y and Z) and is equivalent to SELECT FOO(T.A)::Y, FOO(T.A)::Z FROM T. Converter 10 handles generating all of the ABAP code necessary to effectuate such a scalar function, allowing a specification to specify more complex functions.

As for vector functions, converter 10 generates ABAP language for vector functions, in which input and/or output parameters can be tables. Converter 10 processes vector functions, if they are present in a declarative specification, by generating the appropriate procedural (ABAP) program to execute that specification. The ABAP code generated by converter 10 handles a wide range of other operations. For example, ABAP code to read and load R/3 tables and files is supported. Another supported operation is table lookup, which is an operation that returns a value from a table given values for a set of keys. For example, given an employee ID, a table lookup operation may return the employee's department number from the department table.

Converter 10 also handles parameterized declarative extraction specifications and generates therefrom parameterized ABAP programs for extracting data from SAP R/3 such that parameters can be passed at run-time to affecting the operation of the ABAP program. In some cases, the data being joined as a result of a specification is includes some R/3 data and some non-R/3 data, including relational databases and files. The data can be joined from a single declarative specification. The result of the conversion of such a specification is set of ABAP programs, SQL queries and in-memory transformation modules to extract, transform and load the data from the multiple sources.

In some embodiments, converter 10 can carry through user-written ABAP code to be combined with the generated ABAP code. A user can write custom ABAP code and specify the output schema for the custom code. In this way, the custom code can be executed as part of the extraction specification and to the data generated by this custom ABAP code can be used in subsequent transformations.

Normally, declarative specifications do not allow for a specified number of iterations, but converter 10 accepts iterator participation in a declarative specification. An iterator can be implemented as an ordered set of integers. The set size is specified by the user. This set can be combined with other operations to simulate a set number of iterations. For example, an iterator set of 12 can be joined with an employee table to return a set of the 12 highest paid employees. Another example is that an iteration set of 100 can be used to call a function 100 times—one for each row in the set. In this way, an iterator set can be used to simulate iterations for declarative languages, such as SQL, that do not have iteration operations.

Converter 10 also generates ABAP code to integrate IDOCs (Intermediate DOCuments) with relational tables. IDOCs are hierarchical multi-set structures in which each level is called a segment. Each segment contains rows of columns as well as other segments (called subsegments). For example, a segment can have columns A and B and segments C and D where A is an integer, B is a string (10) field and C is a segment with columns X, Y and subsegment Z, where X is an integer, Y is an integer and Z is a segment, etc. Each row of such a segment would have a value for column A, a value for column B and two subsegments C and D, where subsegment C would have a set of rows where each row has a value for column X, a value for column Y and a subsegment Z, and so on. An example of an IDOC description report generated by SAP R/3 is included in Appendix C. The IDOC format for intermediate documents is a SAP specific format, typically used for electronic data interchange ("EDI") and Application Linking and Embedding ("ALE") used for communication between different SAP systems.

An IDOC is characterized by an IDOC type, which indicates the SAP format is used to interpret the data of a business transaction. An IDOC type comprises a control record, which is identical for each IDOC type, data records and status records. One data record comprises a fixed key part and a variable data part, where the data part is interpreted using segments, which differ depending on the IDOC type selected and specify the format with which the data records of IDOCs are interpreted.

In a typical approach, a tool extracts data from an IDOC by placing the IDOC data into a file and having a procedural specification for how to read and transform the file, such as the files used by the Mercator™ system sold by TSI corporation. Converter 10 generates ABAP code to extract data from the IDOCs without needing to first place the data in files.

If necessary, converter 10 can treat individual segments and subsegments as relational tables and allow them to participate in relational queries or can generate the necessary ABAP code to perform the same function.

As described above, data can be extracted a SAP R/3 Enterprise Resource Planning system based on a visual and declarative specification of source objects, transformations and target objects. The system described above generates a program of optimized ABAP code to extract, transform and load those objects according to the specification. Source objects include Tables, Hierarchies, Files and IDOCs (intermediate documents). Transformations include standard SQL operations, lookups, joins, function calls, iterators, and custom ABAP blocks. Targets include files or tables.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

APPENDICES

---

A. Generated ABAP program (First Example)

```
REPORT ZAL__ABAP message-id 26 line-size 255
no standard page heading.
* za1.
PARAMETER DOWNLOAD(1) DEFAULT 'Y' lower case. "N-svr,
Y-clnt
PARAMETER EXECMODE(1) DEFAULT 'D' lower case. "D-dlg,
B-btch
PARAMETER OUT__DIR(60) DEFAULT "output file dir
'c:\temp' lower case.
PARAMETER IN__DIR(60) DEFAULT "input file dir
'v:' lower case.
TABLES VBAK.
TABLES VBAP.
DATA: begin of ITAB3 occurs 0,
VBELN(10) TYPE C,
POSNR(6) TYPE C,
AUART(4) TYPE C,
VKGRP(3) TYPE C,
VKBUR(4) TYPE C,
GUEBG TYPE D,
GUEEN TYPE D,
BNAME(35) TYPE C,
MATNR(18) TYPE C,
MATWA(18) TYPE C,
KMPMG(7) TYPE P DECIMALS 3,
WAVWR(7) TYPE P DECIMALS 2,
NETPR(6) TYPE P DECIMALS 2.
DATA: end of ITAB3.
data: append_flag(1) value ' ',
    cntbuf type i;
    delimleng type i.
start-of-selection.
PERFORM FORM3.
PERFORM FORM4.
end-of-selection.
write / '* Program Complete * copyright Acta Technology, Inc'.
FORM FORM3.
DATA ALTMP1(10) TYPE C.
```

A. Generated ABAP program (First Example)

```
DATA ALTMP2(6) TYPE C.
DATA ALTMP3(4) TYPE C.
DATA ALTMP4(3) TYPE C.
DATA ALTMP5(4) TYPE C.
DATA ALTMP6 TYPE D.
DATA ALTMP7 TYPE D.
DATA ALTMP8(35) TYPE C.
DATA ALTMP9(18) TYPE C.
DATA ALTMP10(18) TYPE C.
DATA ALTMP11(7) TYPE P DECIMALS 3.
DATA ALTMP12(7) TYPE P DECIMALS 2.
DATA ALTMP13(6) TYPE P DECIMALS 2.
select
   VBELN
   AUART
   VKGRP
   VKBUR
   GUEBG
   GUEEN
   BNAME
into corresponding fields of VBAK from VBAK.
ALTMP1 = VBAK-VBELN.
ALTMP3 = VBAK-AUART.
ALTMP4 = VBAK-VKGRP.
ALTMP5 = VBAK-VKBUR.
ALTMP6 = VBAK-GUEBG.
ALTMP7 = VBAK-GUEEN.
ALTMP8 = VBAK-BNAME.
select
   VBELN
   POSNR
   MATNR
   MATWA
   KMPMG
   WAVWR
   NETPR
into corresponding fields of VBAP from VBAP where
(VBELN = VBAK-VBELN).
ALTMP2 = VBAP-POSNR.
ALTMP9 = VBAP-MATNR.
ALTMP10 = VBAP-MATWA.
ALTMP11 = VBAP-KMPMG.
ALTMP12 = VBAP-WAVWR.
ALTMP13 = VBAP-NETPR.
   move ALTMP1 to ITAB3-VBELN.
   move ALTMP2 to ITAB3-POSNR.
   move ALTMP3 to ITAB3-AUART.
   move ALTMP4 to ITAB3-VKGRP.
   move ALTMP5 to ITAB3-VKBUR.
   move ALTMP6 to ITAB3-GUEBG.
   move ALTMP7 to ITAB3-GUEEN.
   move ALTMP8 to ITAB3-BNAME.
   move ALTMP9 to ITAB3-MATNR.
   move ALTMP10 to ITAB3-MATWA.
   move ALTMP11 to ITAB3-KMPMG.
   move ALTMP12 to ITAB3-WAVWR.
   move ALTMP13 to ITAB3-NETPR.
   append ITAB3.
   if download = 'N'.
   cntbuf = cntbuf + 1.
if cntbuf > 5000.
     perform FORM4.
     clear cntbuf.
     refresh ITAB3.
     append_flag = 'A'.
     endif.
   endif.
endselect.
endselect.
ENDFORM.
FORM FORM4.
data: outfile(128), Idfile(32).
Idfile = 'out.dat'.
concatenate out_dir Idfile into outfile
   separated by '/'.
data: begin of ht,
   x(1) type x value '2C',
   end of ht.
data dlmtlen type i value '1'.
data return_code type i.
   perform write_delimited_file
     tables     ITAB3
     using     outfile
        append_flag
        ht
        dlmtlen
        download
     changing return_code.
case return_code.
   when 1.
     IF EXECMODE = 'D'.
        WRITE: /5 'No line selected'.
     ELSE.
        MESSAGE E098.
     ENDIF.
   when 2.
     IF EXECMODE = 'D'.
        WRITE: /5 'Open File Error —', 25 OUTFILE.
     ELSE.
        MESSAGE E107 WITH OUTFILE.
     ENDIF.
   when 3.
     IF EXECMODE = 'D'.
        WRITE: /5 'Data exceed length limit (8192)'.
     ELSE.
        MESSAGE E000 WITH
        'Data exceed length limit (8192)'.
     ENDIF.
   when 4.
     IF EXECMODE = 'D'.
        WRITE: /5 'Call function WS_DOWNLOAD error'.
     ELSE.
        MESSAGE E000 WITH
        'Call function WS_DOWNLOAD error'.
     ENDIF.
   endcase.
ENDFORM.
FORM SUBSTRING USING SRC BEG LEN CHANGING RET.
DATA: VA1 TYPE I.
DATA: VA2 TYPE I.
DATA: VA3 TYPE I.
VA3 = STRLEN(SRC).
IF BEG < 1. VA1 = 0.
ELSE.     VA1 = BEG − 1.
ENDIF.
IF LEN < 0. VA2 = 0.
ELSE.     VA2 = VA3 − VA1.
ENDIF.
IF VA2 > LEN. VA2 = LEN.
ENDIF.
IF VA2 < 1. MOVE ''     TO RET.
ELSE.     MOVE SRC+VA1(VA2) TO RET.
ENDIF.
ENDFORM.
   form write_delimited_file
     tables     datatab
     using     file
        append
        delimit
        dlength
        dwnload
     changing rc.
data: type1,
   appd(1),
   temp(32),
   time1(8),
   date1(10),
   output(8192),
   rcount type i,
   offset type i,
   tablen type i,
   maxlen type i value '8192'.
```

A. Generated ABAP program (First Example)

```
data: begin of clientab occurs 0,
          output(8192),
       end of clientab.
field-symbols: <f>.
appd = append.
describe table datatab lines tablen.
if dwnload = 'Y'.
    clear clientab. refresh clientab.
    rcount = 0.
else.
    if appd = space.
        open dataset file for output in text mode.
    else.
        open dataset file for appending in text mode.
    endif.
    if sy-subrc < > 0.
        rc = 2. exit.
    endif.
endif.
loop at datatab.
    clear: tablen, offset, output.
    do.
        assign component sy-index of
            structure datatab to <f>.
        if sy-subrc < > 0. exit. endif.
        if sy-index > 1.
            write delimit to output+offset(dlength).
            add dlength to offset.
        endif.
        describe field <f> type type1.
        if type1 = 'I' or type1 = 'N'.
            type1 = 'P'.
        endif.
        case type1.
            when 'D'.
                if <f> = '00000000'.
                    <f> = ' '.
                else.
                    move <f> to time1.
                    assign time 1 to <f>.
                endif.
            when 'F'.
                if <f> = '0.0'.
                    temp = '0.0'.
                else.
                    write <f> to temp exponent 0.
                endif.
                condense temp no-gaps.
                translate temp using ',.'.
                assign temp to <f>.
            when 'P'.
                if <f> < 0.
                    write '-' to output+offset(1).
                    add 1 to offset.
                    <f> = <f> * (−1).
                endif.
                move <f> to temp.
                condense temp no-gaps.
                translate temp using ',.'.
                assign temp to <f>.
        endcase.
        sy-fdpos = strlen(<f>).
        tablen = offset + sy-fdpos.
        if tablen > maxlen.
            rc = 3. exit.
        endif.
        write <f> to output+offset(sy-fdpos).
        add sy-fdpos to offset.
    enddo.
    if dwnload = 'Y'.
        clientab-output = output.
        append clientab.
```

A. Generated ABAP program (First Example)

```
        rcount = rcount + 1.
        if rcount >= 50.
            CALL FUNCTION 'WS_DOWNLOAD'
            EXPORTING
                FILENAME    = file.
                FILETYPE    = 'DAT'
                MODE        = appd
            TABLES
                DATA_TAB    = clientab
            exceptions
                file_open_error    = 1
                file_write_error   = 2
                invalid_filesize   = 3
                invalid_table_width = 4
                invalid_type       = 5
                no_batch           = 6
                unknown_error      = 7
                others             = 8.
            if sy-subrc < > 0.
                rc = 4.
            endif.
            clear clientab. refresh clientab.
            rcount = 0. appd = 'A'.
        endif.
    else.
        transfer output to file.
    endif.
endloop.
if dwnload = 'Y'.
    CALL FUNCTION 'WS_DOWNLOAD'
    EXPORTING
        FILENAME    = file
        FILETYPE    = 'DAT'
        MODE        = appd
    TABLES
        DATA_TAB    = clientab
    exceptions
        file_open_error    = 1
        file_write_error   = 2
        invalid_filesize   = 3
        invalid_table_width = 4
        invalid_type       = 5
        no_batch           = 6
        unknown_error      = 7
        others             = 8.
    if sy-subrc < > 0.
        rc = 4.
    endif.
else.
    close dataset file.
endif.
endform.
```

B. Generated ABAP program (Second Example)

```
REPORT ZAL_ABAP message-id 26 line-size 255
no standard page heading.
* za1.
PARAMETER DOWNLOAD(1) DEFAULT 'Y' lower case. "N-svr,
Y-clnt
PARAMETER EXECMODE(1) DEFAULT 'D' lower case. "D-dlg,
B-btch
PARAMETER OUT_DIR(60) DEFAULT "output file dir
'c:\temp' lower case.
PARAMETER IN_DIR(60) DEFAULT "input file dir
'v:' lower case.
TABLES VBAK.
TABLES VBAP.
DATA: begin of ITAB3 occurs 0,
    VBELN(10) TYPE C,
    POSNR(6) TYPE C,
    AUART(4) TYPE C,
```

-continued
B. Generated ABAP program (Second Example)

```
VKGRP(3) TYPE C,
VKBUR(4) TYPE C,
GUEBG TYPE D,
GUEEN TYPE D,
BNAME(35) TYPE C,
MATNR(18) TYPE C,
MATWA(18) TYPE C,
KMPMG(7) TYPE P DECIMALS 3,
WAVWR(7) TYPE P DECIMALS 2,
NETPR(6) TYPE P DECIMALS 2.
DATA: end of ITAB3.
data: append_flag(1) value ' ',
      cntbuf type i;
      delimleng type i.
start-of-selection.
PERFORM FORM3.
PERFORM FORM4.
end-of-selection.
write / '* Program Complete * copyright Acta Technology, Inc'.
FORM FORM3.
DATA ALTMP1(10) TYPE C.
DATA ALTMP2(6) TYPE C.
DATA ALTMP3(4) TYPE C.
DATA ALTMP4(3) TYPE C.
DATA ALTMP5(4) TYPE C.
DATA ALTMP6 TYPE D.
DATA ALTMP7 TYPE D.
DATA ALTMP8(35) TYPE C.
DATA ALTMP9(18) TYPE C.
DATA ALTMP10(18) TYPE C.
DATA ALTMP11(7) TYPE P DECIMALS 3.
DATA ALTMP12(7) TYPE P DECIMALS 2.
DATA ALTMP13(6) TYPE P DECIMALS 2.
select
   VBELN
   POSNR
   MATNR
   MATWA
   KMPMG
   WAVWR
   NETPR
into corresponding fields of VBAP from VBAP where
(POSNR = 'XYZ123').
ALTMP2 = VBAP-POSNR.
ALTMP9 = VBAP-MATNR.
ALTMP10 = VBAP-MATWA.
ALTMP11 = VBAP-KMPMG.
ALTMP12 = VBAP-WAVWR.
ALTMP13 = VBAP-NETPR.
select
   VBELN
   AUART
   VKGRP
   VKBUR
   GUEBG
   GUEEN
   BNAME
into corresponding fields of VBAK from VBAK where
(VBELN = VBAP-VBELN).
ALTMP1 = VBAK-VBELN.
ALTMP3 = VBAK-AUART.
ALTMP4 = VBAK-VKGRP.
ALTMP5 = VBAK-VKBUR.
ALTMP6 = VBAK-GUEBG.
ALTMP7 = VBAK-GUEEN.
ALTMP8 = VBAK-BNAME.
   move ALTMP1 to ITAB3-VBELN.
   move ALTMP2 to ITAB3-POSNR.
   move ALTMP3 to ITAB3-AUART.
   move ALTMP4 to ITAB3-VKGRP.
   move ALTMP5 to ITAB3-VKBUR.
   move ALTMP6 to ITAB3-GUEBG.
   move ALTMP7 to ITAB3-GUEEN.
   move ALTMP8 to ITAB3-BNAME.
   move ALTMP9 to ITAB3-MATNR.
   move ALTMP10 to ITAB3-MATWA.
   move ALIMP11 to ITAB3-KMPMG.
```

-continued
B. Generated ABAP program (Second Example)

```
   move ALTMP12 to ITAB3-WAVWR.
   move ALTMP13 to ITAB3-NETPR.
   append ITAB3.
   if download = 'N'.
   cntbuf = cntbuf + 1.
   if cntbuf > 5000.
      perform FORM4.
      clear cntbuf.
      refresh ITAB3.
      append_flag = 'A'.
   endif.
   endif.
endselect.
endselect.
ENDFORM.
FORM FORM4.
data: outfile(128), Idfile(32).
Idfile = 'out.dat'.
concatenate out_dir Idfile into outfile
   separated by '/'.
data: begin of ht,
      x(1) type x value '2C',
      end of ht.
data dlmtlen type i value '1'.
data return_code type i.
   perform write_delimited_file
      tables    ITAB3
      using     outfile
                append_flag
                ht
                dlmtlen
                download
      changing return_code.
case return_code.
   when 1.
      IF EXECMODE = 'D'.
         WRITE: /5 'No line selected'.
      ELSE.
         MESSAGE E098.
      ENDIF.
   when 2.
      IF EXECMODE = 'D'.
         WRITE: /5 'Open File Error —', 25 OUTFILE.
      ELSE.
         MESSAGE E107 WITH OUTFILE.
      ENDIF.
   when 3.
      IF EXECMODE = 'D'.
         WRITE: /5 'Data exceed length limit (8192)'.
      ELSE.
         MESSAGE E000 WITH
            'Data exceed length limit (8192)'.
      ENDIF.
   when 4.
      IF EXECMODE = 'D'.
         WRITE: /5 'Call function WS_DOWNLOAD error'.
      ELSE.
         MESSAGE E000 WITH
            'Call function WS_DOWNLOAD error'.
      ENDIF.
   endcase.
ENDFORM.
FORM SUBSTRING USING SRC BEG LEN CHANGING RET.
DATA: VA1 TYPE I.
DATA: VA2 TYPE I.
DATA: VA3 TYPE I.
VA3 = STRLEN(SRC).
IF BEG < 1. VA1 = 0.
ELSE.    VA1 = BEG - 1.
ENDIF.
IF LEN < 0. VA2 = 0.
ELSE.    VA2 = VA3 - VA1.
ENDIF.
IF VA2 > LEN. VA2 = LEN.
ENDIF.
IF VA2 < 1. MOVE ''    TO RET.
ELSE.    MOVE SRC+VA1(VA2) TO RET.
```

B. Generated ABAP program (Second Example)

```
ENDIF.
ENDFORM.
form write_delimited_file
        tables    datatab
        using    file
                 append
                 delimit
                 dlength
                 dwnload
        changing rc.
data: type1,
        appd(1),
        temp(32),
        time1(8),
        date1(10),
        output(8192),
        rcount type i,
        offset type i,
        tablen type i,
        maxlen type i value '8192'.
data: begin of clientab occurs 0,
        output(8192),
        end of clientab.
field-symbols: <f>.
appd = append.
describe table datatab lines tablen.
if dwnload = 'Y'.
    clear clientab. refresh clientab.
    rcount = 0.
else.
    if appd = space.
        open dataset file for output in text mode.
    else.
        open dataset file for appending in text mode.
    endif.
    if sy-subrc < > 0.
        rc = 2. exit.
    endif.
endif.
loop at datatab.
    clear: tablen, offset, output.
    do.
        assign component sy-index of
          structure datatab to <f>.
        if sy-subrc < > 0. exit. endif.
        if sy-index > 1.
            write delimit to output+offset(dlength).
            add dlength to offset.
        endif.
        describe field <f> type type1.
        if type1 = 'I' or type1 = 'N'.
            type1 = 'P'.
        endif.
        case type1.
            when 'D'.
                if <f> = '00000000'.
                    <f> = ' '.
                else.
                    move <f> to time1.
                    assign time 1 to <f>.
                endif.
            when 'F'.
                if <f> = '0.0'.
                    temp = '0.0'.
                else.
                    write <f> to temp exponent 0.
                endif.
                condense temp no-gaps.
                translate temp using ',.'.
                assign temp to <f>.
            when 'P'.
                if <f> < 0.
                    write '-' to output+offset(1).
                    add 1 to offset.
                    <f> = <f> * (-1).
                endif.
                move <f> to temp.
```

B. Generated ABAP program (Second Example)

```
                condense temp no-gaps.
                translate temp using ',.'.
                assign temp to <f>.
        endcase.
        sy-fdpos = strlen(<f>).
        tablen = offset + sy-fdpos.
        if tablen > maxlen.
            rc = 3. exit.
        endif.
        write <f> to output+offset(sy-fdpos).
        add sy-fdpos to offset.
    enddo.
    if dwnload = 'Y'.
        clientab-output = output.
        append clientab.
        rcount = rcount + 1.
        if rcount >= 50.
            CALL FUNCTION 'WS_DOWNLOAD'
                EXPORTING
                    FILENAME    = file.
                    FILETYPE    = 'DAT'
                    MODE        = appd
                TABLES
                    DATA_TAB    = clientab
                exceptions
                    file_open_error     = 1
                    file_write_error    = 2
                    invalid_filesize    = 3
                    invalid_table_width = 4
                    invalid_type        = 5
                    no_batch            = 6
                    unknown_error       = 7
                    others              = 8.
            if sy-subrc < > 0.
                rc = 4.
            endif.
            clear clientab. refresh clientab.
            rcount = 0. appd = 'A'.
        endif.
    else.
        transfer output to file.
    endif.
endloop.
if dwnload = 'Y'.
    CALL FUNCTION 'WS_DOWNLOAD'
        EXPORTING
            FILENAME    = file
            FILETYPE    = 'DAT'
            MODE        = appd
        TABLES
            DATA_TAB    = clientab
        exceptions
            file_open_error     = 1
            file_write_error    = 2
            invalid_filesize    = 3
            invalid_table_width = 4
            invalid_type        = 5
            no_batch            = 6
            unknown_error       = 7
            others              = 8.
    if sy-subrc < > 0.
        rc = 4.
    endif.
else.
    close dataset file.
endif.
endform.
```

C. IDOC Description

The following is an example of an IDOC format:

| 1. Output IDoc type: BLAORD01 Purchasing contracts | | | | |
|---|---|---|---|---|
| E1EDK01 | M | 1 | 1 | IDoc: Document header general data |
| E1EDKD1 | M | 1 | 1 | IDoc: Doc.header additional data |
| E1EDK14 | C | 1 | 99 | IDoc: Doc.header organizational data |
| E1EDK03 | C | 1 | 99 | IDoc: Document header date segment |
| E1EDKA1 | C | 1 | 99 | IDoc: Doc.header partner information |
| E1EDK02 | C | 1 | 99 | IDoc: Document header reference data |
| E1EDK17 | C | 1 | 99 | IDoc: Doc.header terms of delivery |
| E1EDK18 | C | 1 | 99 | IDoc: Doc.header terms of payment |
| E1EDKP1 | C | 1 | 999 | IDoc: Doc.header partner in purchasing |
| E1EDP01 | C P | 1 | 999999 | IDoc: Doc.item general data |
| E1EDP02 | C | 1 | 99 | IDoc: Doc.item reference data |
| E1EDP19 | C | 1 | 99 | IDoc: Doc.item object identification |
| E1EDP17 | C | 1 | 99 | IDoc: Doc.item terms of delivery |
| E1EDPD1 | C | 1 | 1 | IDoc: Doc.item additional data |
| E1EDS01 | C | 1 | 99 | IDoc: Summary segment general |
| 2. Output IDoc type: BLAORD01 Purchasing contracts | | | | |
| E1EDK01 | M | 1 | 1 | IDoc: Document header general data |
| ACTION | | | 3 | Action code for the whole EDI message |
| KZABS | | | 1 | Indicator for order acknowledgment requirement |
| CURCY | | | 3 | Currency |
| HWAER | | | 3 | EDI local currency |
| WKURS | | | 12 | Exchange rate |
| ZTERM | | | 17 | Terms of payment key |
| KUNDEUINR | | | 20 | VAT registration number |
| EIGENUINR | | | 20 | VAT registration number |
| BSART | | | 4 | Document type |
| BELNR | | | 35 | IDOC document number |
| NTGEW | | | 18 | Net weight |
| BRGEW | | | 18 | Net weight |
| GEWEI | | | 3 | Weight unit |
| FKART_RL | | | 4 | Invoice list type |
| ABLAD | | | 25 | Unloading point |
| BSTZD | | | 4 | Purchase order number supplement |
| VSART | | | 2 | Shipping type |
| VSART_BEZ | | | 20 | Description of the shipping type |
| RECIPNT_NO | | | 10 | Number of recipient (for control via the ALE model) |
| E1EDKD1 | M | 1 | 1 | IDoc: Doc.header additional data |
| EKORG | | | 4 | Purchasing organization |
| EKGRP | | | 3 | Purchasing group |
| E1EDK14 | C | 1 | 99 | IDoc: Doc.header organizational data |
| QUALF | | | 3 | IDOC qualifier organization |
| ORGID | | | 35 | IDOC organization |
| E1EDK03 | C | 1 | 99 | IDoc: Document header date segment |
| IDDAT | | | 3 | Qualifier for IDOC date segment |
| DATUM | | | 8 | IDOC: Date |
| UZEIT | | | 6 | IDOC: Time |
| E1EDKA1 | C | 1 | 99 | IDoc: Doc.header partner information |
| PARVW | | | 3 | Partner function (e.g. sold-to party, ship-to party, ...) |
| PARTN | | | 17 | Partner number |
| LIFNR | | | 17 | Vendor number at customer, location |
| NAME1 | | | 35 | Name 1 |
| NAME2 | | | 35 | Name 2 |
| NAME3 | | | 35 | Name 3 |
| NAME4 | | | 35 | Name 4 |
| STRAS | | | 35 | Street and house number 1 |
| STRS2 | | | 35 | Street and house number 2 |
| PFACH | | | 35 | PO box |
| ORT01 | | | 35 | City |
| COUNC | | | 9 | County code |
| PSTLZ | | | 9 | Postal code |
| PSTL2 | | | 9 | Postal code of PO box |
| LAND1 | | | 3 | Country key |
| ABLAD | | | 35 | Unloading point |
| PERNR | | | 30 | Contact person's personnel number |
| PARNR | | | 30 | Contact person's number (not personnel number) |
| TELF1 | | | 25 | 1st telephone number of contact person |
| TELF2 | | | 25 | 2nd telephone number of contact person |
| TELBX | | | 25 | Telebox number |
| TELFX | | | 25 | Fax number |
| TELTX | | | 25 | Teletex number |
| TELX1 | | | 25 | Telex number |
| SPRAS | | | 1 | Language key |

-continued

| | | | | |
|---|---|---|---|---|
| ANRED | | | 15 | Title |
| ORT02 | | | 35 | District |
| HAUSN | | | 6 | House number |
| STOCK | | | 6 | Floor |
| REGIO | | | 3 | Region |
| PARGE | | | 1 | Partner's sex |
| ISOAL | | | 2 | Country ISO code |
| ISONU | | | 2 | Country ISO code |
| FCODE | | | 20 | Company key (France) |
| IHREZ | | | 30 | Your reference (partner's) |
| BNAME | | | 35 | IDOC user name |
| PAORG | | | 30 | IDOC organization code |
| ORGTX | | | 35 | IDOC organization code |
| PAGRU | | | 30 | IDOC group code |
| E1EDK02 | C | 1 | 99 | IDoc: Document header reference data |
| QUALF | | | 3 | IDOC qualifier reference document |
| BELNR | | | 35 | IDOC document number |
| POSNR | | | 6 | Item number |
| DATUM | | | 8 | IDOC: Date |
| UZEIT | | | 6 | IDOC: Time |
| E1EDK17 | C | 1 | 99 | IDoc: Doc.header terms of delivery |
| QUALF | | | 3 | IDOC qualifier: Terms of delivery |
| LKOND | | | 3 | IDOC delivery condition code |
| LKTEXT | | | 70 | IDOC delivery condition text |
| E1EDK18 | C | 1 | 99 | IDoc: Doc.header terms of payment |
| QUALF | | | 3 | IDOC qualifier: Terms of payment |
| TAGE | | | 8 | IDOC Number of days |
| PRZNT | | | 8 | IDOC percentage for terms of payment |
| ZTERM_TXT | | | 70 | Line of text |
| E1EDKP1 | C | 1 | 999 | IDoc: Doc.header partner in purchasing |
| EKORG | | | 4 | Purchasing organization |
| LTSNR | | | 6 | Vendor sub-range |
| WERKS | | | 4 | Plant |
| PARVW | | | 2 | Partner function ID (e.g. SH for ship-to party) |
| LIFN2 | | | 10 | Reference to other vendor |
| DEFPA | | | 1 | Default partner |
| E1EDP01 | C P | 1 | 999999 | IDoc: Doc.item general data |
| POSEX | | | 6 | Item number |
| ACTION | | | 3 | Action code for the item |
| PSTYP | | | 1 | Item category |
| KZABS | | | 1 | Indicator for order acknowledgment requirement |
| MENGE | | | 15 | Quantity |
| MENEE | | | 3 | Unit of measure |
| BMNG2 | | | 15 | Quantity in price unit |
| PMENE | | | 3 | Price unit of measure |
| ABFTZ | | | 7 | Agreed cumulative quantity |
| VPREI | | | 15 | Price (net) |
| PEINH | | | 9 | Price unit |
| NETWR | | | 18 | Item value (net) |
| ANETW | | | 18 | Absolute net value of item |
| SKFBP | | | 18 | Amount qualifying for cash discount |
| NTGEW | | | 18 | Net weight |
| GEWEI | | | 3 | Weight unit |
| EINKZ | | | 1 | Flag: More than one schedule line for the item |
| CURCY | | | 3 | Currency |
| PREIS | | | 18 | Gross price |
| MATKL | | | 9 | IDOC material class |
| UEPOS | | | 6 | Higher-level item in BOM structures |
| GRKOR | | | 3 | Delivery group (items delivered together) |
| EVERS | | | 7 | Shipping instructions |
| BPUMN | | | 6 | Denominator for conv. of order price unit into order unit |
| BPUMZ | | | 6 | Numerator for conv. of order price unit into order unit |
| ABGRU | | | 2 | Reason for rejection of quotations and sales orders |
| ABGRT | | | 40 | Description |
| E1EDP02 | C | 1 | 99 | IDoc: Doc.item reference data |
| QUALF | | | 3 | IDOC qualifier reference document |
| BELNR | | | 35 | IDOC document number |
| ZEILE | | | 6 | Item number |
| DATUM | | | 8 | IDOC: Date |
| UZEIT | | | 6 | IDOC: Time |
| E1EDP19 | C | 1 | 99 | IDoc: Doc.item object identification |
| QUALF | | | 3 | IDOC object ID such as material no., customer |
| IDTNR | | | 35 | IDOC material ID |
| KTEXT | | | 70 | IDOC short text |
| E1EDP17 | C | 1 | 99 | IDoc: Doc.item terms of delivery |
| QUALF | | | 3 | IDOC qualifier: Terms of delivery |
| LKOND | | | 3 | IDOC delivery condition code |
| LKTEXT | | | 70 | IDOC delivery condition text |
| LPRIO | | | 2 | Delivery priority |

-continued

| | | | | |
|---|---|---|---|---|
| E1EDPD1 | C | 1 | 1 | IDoc: Doc.item additional data |
| KNTTP | | | 1 | Account assignment category |
| BEDNR | | | 10 | Requirement tracking number |
| PRSDR | | | 1 | Indicator: print price |
| UNTTO | | | 4 | Underdelivery tolerance limit |
| UEBTO | | | 4 | Overdelivery tolerance limit |
| UEBTK | | | 1 | Indicator: unlimited overdelivery allowed |
| INSMK | | | 1 | Quality inspection indicator |
| SPINF | | | 1 | Indicator: update info record |
| MAHN1 | | | 4 | Number of days for first reminder/urging letter |
| MAHN2 | | | 4 | Number of days for second reminder/urging letter |
| MAHN3 | | | 4 | Number of days for third reminder/urging letter |
| BSTAE | | | 4 | Confirmation control key |
| LABNR | | | 20 | Order acknowledgment number |
| KZABS | | | 1 | Indicator: acknowledgment required |
| SCHPR | | | 1 | Estimated price indicator |
| MWSKZ | | | 2 | Tax code |
| WEBRE | | | 1 | Indicator: GR-based invoice verification |
| E1EDS01 | C | 1 | 99 | IDoc: Summary segment general |
| SUMID | | | 3 | Qualifier for totals segment for shipping notification |
| SUMME | | | 18 | Total value of sum segment |
| SUNIT | | | 3 | Total value unit for totals seg. in shipping notif. |
| WAERQ | | | 3 | Currency |

What is claimed is:

1. A computer readable medium including executable instructions to generate procedural language code for extracting data from an operational system, comprising executable instructions to:
accept a declarative specification;
determine imported metadata from the operational system for the declarative specification; and
generate procedural language code from the declarative specification using the imported metadata, to execute a data extraction, transformation and loading operation defined by the declarative specification.

2. The computer readable medium of claim 1 wherein the executable instructions to generate procedural language code include executable instructions to generate ABAP language code for a SAP R/3 operational system.

3. The computer readable medium of claim 2 wherein the executable instructions further comprise executable instructions, using the metadata and the declarative specification, to determine an optimized plan for performing the data extraction, transformation and loading operation; and executable instructions to use the optimized plan to generate the procedural language code from the declarative specification.

4. The computer readable medium of claim 1 including executable instructions to process a visual specification of the declarative specification.

5. The computer readable medium of claim 1 including executable instructions to process the declarative specification including at least one of a scalar function, a vector function, parameterized declarative extraction specifications, custom ABAP code and a lookup operation.

6. The computer readable medium of claim 1 wherein the executable instructions to generate procedural language code include executable instructions to generate ABAP code to read and load R/3 tables, files and IDOC intermediate documents.

7. The computer readable medium of claim 1 wherein the executable instructions to generate procedural language code include executable instructions to:
read a single declarative specification for extraction of SAP R/3 and non-SAP R/3 data including relational databases and files; and
execute the specification as a set of ABAP programs, SQL queries and in-memory transformation modules to extract, transform and load data from multiple sources.

8. The computer readable medium of claim 1 wherein the executable instructions to generate procedural language code include executable instructions to generate ABAP code with parameter expressions to be evaluated at run time.

9. The computer readable medium of claim 1 further comprising executable instructions to:
integrate an IDOC intermediate document with relational tables; and
generate ABAP code to extract data from integrated intermediate documents and relational tables.

10. The computer readable medium of claim 9 further comprising executable instructions to process individual tables as relational tables.

11. The computer readable medium of claim 10 further comprising executable instructions to generate ABAP code.

12. A computer readable medium including executable instructions to generate procedural language code for extracting data from an operational system, comprising executable instructions to:
import metadata associated with the operational system;
process visual transformations specifying sources and targets;
generate a declarative specification from the visual transformations; and
produce procedural language code from the declarative specification.

13. The computer readable medium of claim 12 further comprising executable instructions to execute a data extraction, transformation and loading process defined by the declarative specification.

14. The computer readable medium of claim 12 wherein the executable instructions to import metadata include executable instructions to process columns, keys, sizes and primary-foreign key relationships for database tables.

15. The computer readable medium of claim 12 further comprising executable instructions to validate the declarative specification against the metadata.

16. The computer readable medium of claim 12 further comprising executable instructions to optimize the performance of tasks identified in the declarative specification.

17. The computer readable medium of claim 12 wherein the executable instructions to produce procedural language code include executable instructions to produce ABAP code.

18. The computer readable medium of claim 12 wherein the executable instructions to generate a declarative specification include executable instructions to produce a declarative specification including at least one of a scalar function, a vector function, parameterized declarative extraction specifications, custom ABAP code and a lookup operation.

19. The computer readable medium of claim 12 wherein the executable instructions to produce procedural language code include executable instructions to produce ABAP code to read and load R/3 tables, files and IDOC intermediate documents.

20. The computer readable medium of claim 12 wherein the executable instructions to produce procedural language code include executable instructions to:

read a single declarative specification for extraction of SAP R/3 and non-SAP R/3 data including relational databases and files; and executing the specification as a set of ABAP programs, SQL queries and in-memory transformation modules to extract, transform and load data from multiple sources.

21. The computer readable medium of claim 12 wherein the executable instructions to produce procedural language code include executable instructions to generate ABAP code with parameter expressions for evaluation at run time.

22. The computer readable medium of claim 12 further comprising executable instructions to:

integrate an IDOC intermediate document with relational tables; and generate ABAP code to extract data from integrated intermediate documents and relational tables.

23. The computer readable medium of claim 22 further comprising executable instructions to process individual tables as relational tables.

* * * * *